United States Patent
Uragaki

(10) Patent No.: US 11,494,274 B2
(45) Date of Patent: Nov. 8, 2022

(54) SYSTEM FOR MIGRATING SETTING VALUES FROM BACKUP SOURCE APPARATUSES

(71) Applicant: CANON KABUSHIKI KAISHA, Tokyo (JP)

(72) Inventor: Takeshi Uragaki, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 16/785,929

(22) Filed: Feb. 10, 2020

(65) Prior Publication Data
US 2020/0301786 A1  Sep. 24, 2020

(30) Foreign Application Priority Data
Mar. 19, 2019  (JP) .............................. JP2019-051430

(51) Int. Cl.
*G06F 11/14* (2006.01)
*G06F 16/21* (2019.01)

(52) U.S. Cl.
CPC ...... *G06F 11/1464* (2013.01); *G06F 11/1456* (2013.01); *G06F 11/1469* (2013.01); *G06F 16/214* (2019.01)

(58) Field of Classification Search
CPC ............. G06F 11/1464; G06F 11/1456; G06F 11/1469
USPC ........................................................ 711/162
See application file for complete search history.

(56) References Cited

U.S. PATENT DOCUMENTS

| 2013/0198137 A1* | 8/2013 | Miller ................. G06F 11/1451 707/646 |
| 2014/0201159 A1* | 7/2014 | Kumarasamy ...... G06F 11/1469 707/679 |
| 2016/0006669 A1* | 1/2016 | Myhill .................... H04L 47/82 709/226 |

(Continued)

FOREIGN PATENT DOCUMENTS

| JP | 2007087001 | * | 4/2007 | ............. G06F 12/00 |
| JP | 2007087001 A |   | 4/2007 |                        |

OTHER PUBLICATIONS

Machine Translation of JP2007087001, Priority Date Apr. 2007.*

*Primary Examiner* — Than Nguyen
(74) *Attorney, Agent, or Firm* — Rossi, Kimms & McDowell LLP

(57) ABSTRACT

A communication system that is capable of migrating setting values of different items from respective backup source apparatuses. The communication system includes a management apparatus that manages backup data of first and second backup source apparatuses, and a communication apparatus that communicates with the management apparatus. The management apparatus includes a processor that executes instructions to hold first backup data obtained from the first backup source apparatus, and hold second backup data obtained from the second backup source apparatus. The communication apparatus includes a processor that executes instructions to obtain a first setting value of a first item from the first backup data received from the management apparatus, obtain a second setting value of a second item that is different from the first item from the second backup data received from the management apparatus, and set up the first setting value and the second setting value.

9 Claims, 14 Drawing Sheets

(56) References Cited

U.S. PATENT DOCUMENTS

| | | | | |
|---|---|---|---|---|
| 2017/0011049 A1* | 1/2017 | Venkatesh | | G06F 11/1453 |
| 2018/0314457 A1* | 11/2018 | Bender | | G06F 3/0634 |
| 2019/0034283 A1* | 1/2019 | Jang | | H04B 5/0031 |
| 2019/0095289 A1* | 3/2019 | Kumar | | G06F 11/1464 |
| 2019/0227883 A1* | 7/2019 | Kumarasamy | | G06F 11/1469 |
| 2020/0319977 A1* | 10/2020 | Samarjai | | G06F 11/1456 |
| 2020/0410418 A1* | 12/2020 | Martynov | | G06F 11/1461 |
| 2021/0271572 A1* | 9/2021 | Qi | | G06F 9/445 |

\* cited by examiner

FIG. 8A

Backup Service

Migration

Enter Tenant Information  [ABCDEFG1234567] — 801

Enter Serial Number  [ABC12345] — 802

803 — [Retrieval Start]

Backup Service

Migration Information
Date           : 2018/01/01
Serial Number  : ABC12345
Result         : Succeeded 806 —
| Backup Data List      |
|-----------------------|
| 2018/06/20 1:00 AM    |
| 2018/10/25 3:00 AM    |
| 2018/12/25 4:00 AM    |

807 — [Migration Start]

Backup Service

Select Migration Target Category

☐ Select All

☐ Basic Setting        ☐ Main Menu Setting
☐ Sheet Type           ☐ Web Browser Setting
☐ Transfer Setting     ☐ Address Book
☐ Box Setting          ☐ Personal Setting
☐ Key Setting          ☐ Certificate Setting

Backup Service

Migration Information
Date           : 2018/12/28
Serial Number  : ABC12345
Result         : Succeeded

811

SYSTEM FOR MIGRATING SETTING VALUES FROM BACKUP SOURCE APPARATUSES

BACKGROUND OF THE INVENTION

Field of the Invention

The present invention relates to a communication system, a communication apparatus, a backup source apparatus, a management apparatus, control methods therefor, and storage media storing programs causing a computer to execute these control methods.

Description of the Related Art

There is a known communication system including a server that holds setting data of a plurality of backup source apparatuses as backup data and a communication apparatus communicates with the server. The backup data held by the server is used for a process to restore data of a broken backup source apparatus and for a migration process that migrates setting data of a certain backup source apparatus to another apparatus, for example. In the migration process, a part of the backup data of the backup source apparatus, which is setting values of items that are available to the communication apparatus among the backup data of the backup source apparatus for example, is migrated to the communication apparatus (for example, see Japanese Laid-Open Patent Publication (Kokai) No. 2007-87001 (JP 2007-87001A)).

However, the technique of the above-mentioned publication cannot migrate setting values of only items that a user desires to the communication apparatus in the migration process. That is, the setting values of all the items that are available to the communication apparatus are migrated. In a case where the server manages backup data of a plurality of backup source apparatuses particularly, the technique cannot migrate setting values of different items from the respective backup source apparatuses to one communication device.

SUMMARY OF THE INVENTION

The present invention provides a communication system that is capable of migrating setting values of different items from respective backup source apparatuses. The present invention also provides a communication apparatus, a backup source apparatus, and a management apparatus that constitute the communication system, a control method for the communication system, control methods for the apparatuses, and storage media storing programs causing a computer to execute these control methods.

Accordingly, a first aspect of the present invention provides a communication system including a management apparatus that manages backup data of at least two backup source apparatuses including a first backup source apparatus and a second backup source apparatus, and a communication apparatus that communicates with the management apparatus. The management apparatus includes a first memory device that stores a set of instructions, and at least one processor that executes the set of instructions to hold first backup data obtained from the first backup source apparatus, hold second backup data obtained from the second backup source apparatus. The communication apparatus includes a second memory device that stores a set of instructions, and at least one processor that executes the set of instructions to obtain a first setting value of a first item from first backup data received from the management apparatus, obtain a second setting value of a second item that is different from the first item from the second backup data received from the management apparatus, and set up the first setting value and the second setting value.

Accordingly, a second aspect of the present invention provides a communication apparatus that communicates with a management apparatus that manages backup data of at least two backup source apparatuses including a first backup source apparatus and a second backup source apparatus. The communication apparatus includes a memory device that stores a set of instructions; and at least one processor that executes the set of instructions to obtain a first setting value of a first item from first backup data received from the management apparatus, obtain a second setting value of a second item that is different from the first item from second backup data received from the management apparatus, set up the first setting value and the second setting value, and allow a user to select the first setting item and the second setting item.

Accordingly, a third aspect of the present invention provides a backup source apparatus that communicates with a management apparatus holding backup data, the backup source apparatus including a memory device that stores a set of instructions, and at least one processor that executes the set of instructions to transmit the backup data of the backup source apparatus to the management apparatus, allow a user to select an item corresponding to a setting value used for migration from among a plurality of items that constitute the backup data of the backup source apparatus, add selection item information showing the item selected by the user to the backup data in a case where the user instructs backup, and transmit the backup data to which the selection item information is added to the management apparatus.

Accordingly, a fourth aspect of the present invention provides a management apparatus that manages backup data of at least two backup source apparatuses including a first backup source apparatus and a second backup source apparatus and transmits the backup data in response to a request. The management apparatus includes a memory device that stores a set of instructions, and at least one processor that executes the set of instructions to hold the backup data received from the first backup source apparatus, and hold the backup data received from the second backup source apparatus. Selection item information showing an item corresponding to a setting value used for migration among a plurality of items constituting the backup data is added to the backup data.

Accordingly, a fifth aspect of the present invention provides a control method for the communication system including holding first backup data obtained from the first backup source apparatus by the management apparatus, holding second backup data obtained from the second backup source apparatus by the management apparatus, obtaining a first setting value of a first item from the first backup data received from the management apparatus by the communication apparatus, obtaining a second setting value of a second item that is different from the first item from the second backup data received from the management apparatus by the communication apparatus, and setting up the first setting value and the second setting value by the communication apparatus.

Accordingly, a sixth aspect of the present invention provides a control method for the communication apparatus including obtaining a first setting value of a first item from the backup data of the first backup source apparatus received from the management apparatus, obtaining a second setting value of a second item that is different from the first item from the backup data of the second backup source apparatus received from the management apparatus, setting up the first setting value and the second setting value, and allowing a user to select the first item and the second item.

Accordingly, a seventh aspect of the present invention provides a control method for a backup source apparatus that communicates with the management apparatus, the control method including transmitting backup data of the backup source apparatus to the management apparatus, allowing a user to select an item corresponding to a setting value used for migration from among a plurality of items that constitute the backup data of the backup source apparatus, adding selection item information showing the item selected by the user to the backup data in a case where the user instructs backup, and transmitting the backup data to which the selection item information is added to the management apparatus.

Accordingly, an eighth aspect of the present invention provides a control method for the management apparatus including holding the backup data received from the first backup source apparatus, and holding the backup data received from the second backup source apparatus. Selection item information showing an item corresponding to a setting value used for migration among a plurality of items constituting the backup data is added to the backup data.

Accordingly, ninth through twelfth aspects of the present invention provide non-transitory computer-readable storage mediums storing control programs causing a computer to execute the control methods of the fifth through eighth aspects, respectively.

According to the present invention, the setting values of the different items are migratable from the backup data of the respective backup source apparatuses in the migration process.

Further features of the present invention will become apparent from the following description of exemplary embodiments with reference to the attached drawings.

BRIEF DESCRIPTION OF THE DRAWINGS

FIG. 8A, FIG. 8B, FIG. 8C, and FIG. 8D are views showing examples of migration setting screens displayed on the operation unit of the communication device in the embodiment.

DESCRIPTION OF THE EMBODIMENTS

Figure 1:
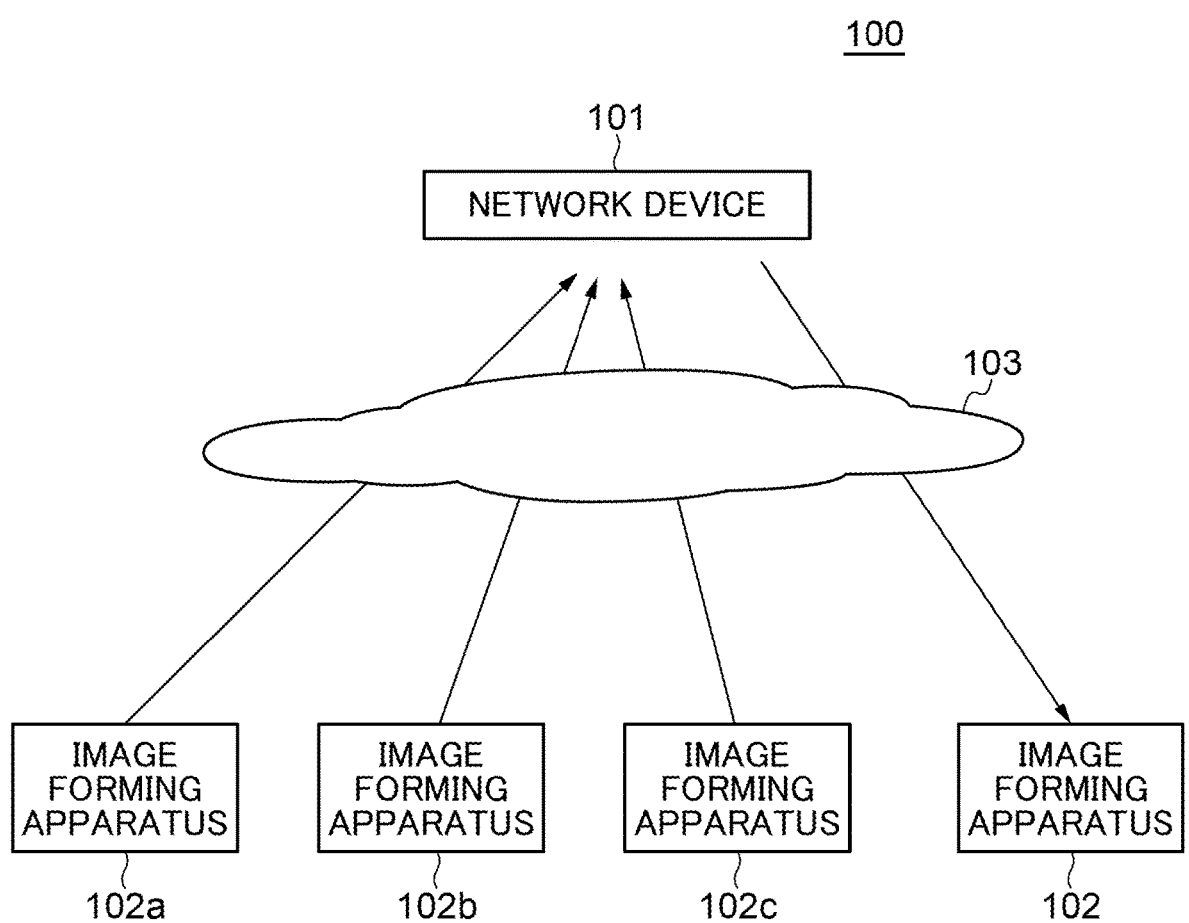
FIG. 1 is a block diagram schematically showing a configuration of a communication system concerning an embodiment of the present invention.

Hereafter, embodiments according to the present invention will be described in detail by referring to the drawings.

FIG. 1 is a block diagram schematically showing a configuration of a communication system 100 concerning an embodiment of the present invention. As shown in FIG. 1, the communication system 100 is provided with a network device 101 as a management apparatus, an image forming apparatus 102 as a communication apparatus, and image forming apparatuses 102a, 102b, and 102c as backup source apparatuses.

The network device 101 is able to perform data communication with the image forming apparatuses 102, 102a, 102b, and 102c that constitute a network 103. The network 103 is the Internet or an intranet, for example. The network device 101 obtains setting data from the respective image forming apparatuses 102a, 102b, and 102c, and holds the obtained setting data as backup data, for example. The backup data held by the network device 101 are used for a process to restore data of a broken apparatus and a migration process that migrates data to another apparatus. For example, when the setting data of the image forming apparatus 102a is migrated to the image forming apparatus 102, the network device 101 transmits the backup data of the image forming apparatus 102a from among the held backup data to the image forming apparatus 102. The image forming apparatus 102 sets up a plurality of setting values included in the received backup data of the image forming apparatus 102a.

Next, a hardware constitution of the image forming apparatuses 102, 102a, 102b, and 102c. The image forming apparatuses 102, 102a, 102b, and 102c have the same hardware configuration, and the hardware configuration of the image forming apparatus 102 will be described as an example. Moreover, components of the image forming apparatuses 102a, 102b, and 102c corresponding to a component of the image forming apparatus 102 are indicated by signs that "a", "b", and "c" are added to the end of the sign of the component of the image forming apparatus 102 in the following description.

Figure 2:
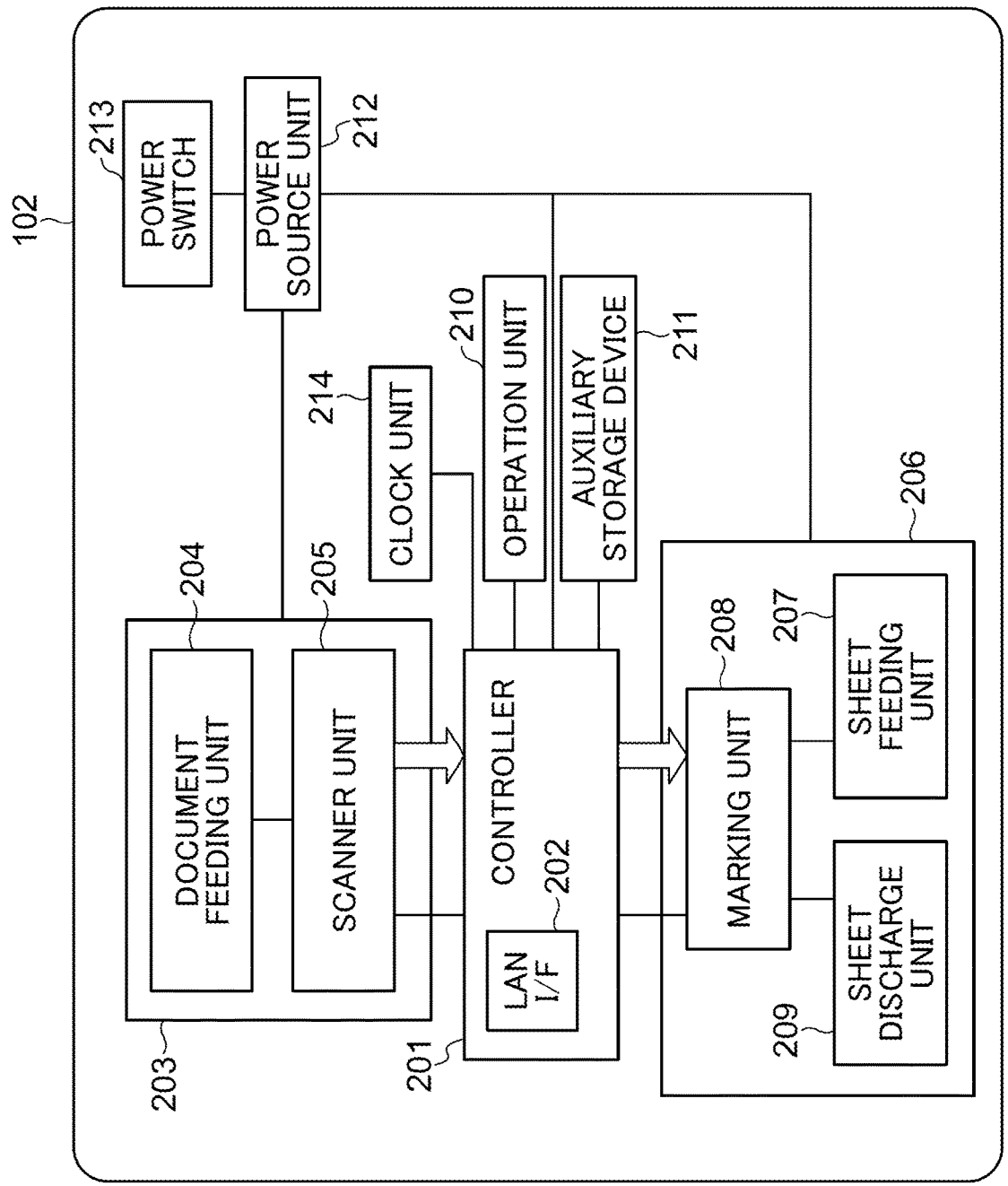
FIG. 2 is a block diagram schematically showing a hardware configuration of an image forming apparatus in FIG. 1.

FIG. 2 is a block diagram schematically showing a hardware configuration of the image forming apparatus 102 in FIG. 1. As shown in FIG. 2, the image forming apparatus 102 is provided with a controller 201, a scanner 203, a printer 206, an operation unit 210, an auxiliary storage device 211, a power source unit 212, a power switch 213, and a clock unit 214. The controller 201 is connected with the scanner 203, printer 206, operation unit 210, auxiliary storage device 211, power source unit 212, and clock unit 214.

The controller 201 integrally controls the entire image forming apparatus 102. Moreover, the controller 201 transmits and receives data with an external apparatus through a LAN I/F 202 provided in the controller 201 concerned. The scanner 203 is provided with a document feeding unit 204 and a scanner unit 205. The document feeding unit 204 conveys a plurality of documents to the scanner unit 205 one by one. The scanner unit 205 optically scans the conveyed document and converts scanned image data into digital image data. The digital image data concerned is transmitted to the controller 201.

The printer 206 is provided with a sheet feeding unit 207, marking unit 208, and sheet discharge unit 209. The printer unit 206 prints the digital image data onto a sheet. The sheet feeding unit 207 feeds a plurality of stored sheets to the marking unit 208 one by one. The marking unit 208 prints image data on a fed sheet. The sheet discharge unit 209 discharges the printed sheet. The operation unit 210 receives an instruction from a user and displays various screens. The auxiliary storage device 211 stores digital image data and a control program. Moreover, the auxiliary storage device 211 stores setting data about various functions of the image forming apparatus 102, address book data, etc. The power source unit 212 controls electric power supplied to the controller 201, scanner 203, and printer 206. For example, when a user presses the power switch 213 as an instruction to turn ON the power of the image forming apparatus 102, the power source unit 212 supplies electric power to the controller 201, scanner 203, and printer 206. The clock unit 214 counts time.

Figure 3:
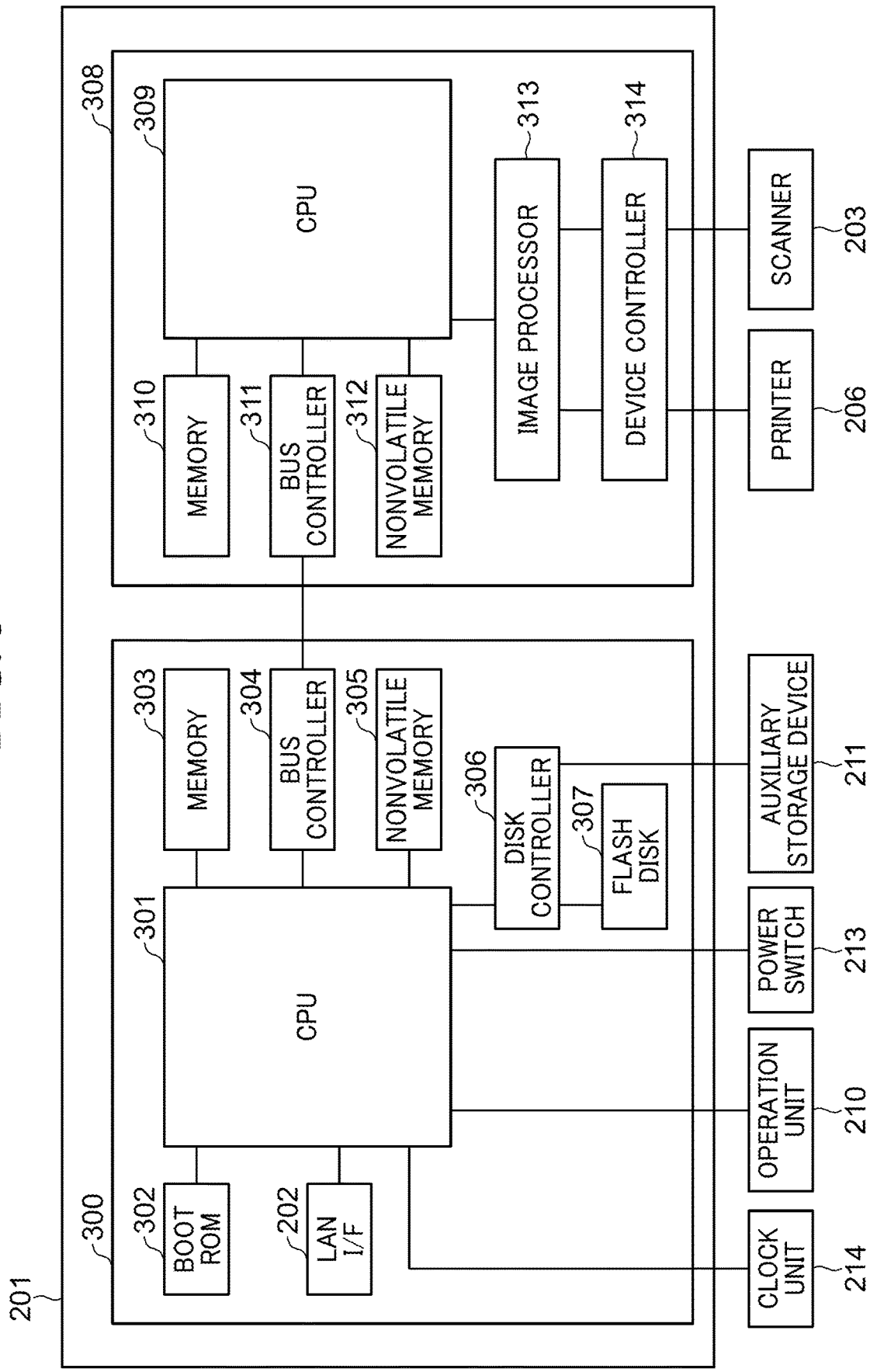
FIG. 3 is a block diagram schematically showing a configuration of a controller shown in FIG. 2.

FIG. 3 is a block diagram schematically showing the configuration of the controller 201 shown in FIG. 2. As shown in FIG. 3, the controller 201 is provided with a mainboard 300 and a subboard 308.

The operation unit 210, auxiliary storage device 211, power switch 213, and clock unit 214 are connected to the mainboard 300. The mainboard 300 is a general-purpose CPU system. The mainboard 300 is provided with a CPU 301, boot ROM 302, memory 303, bus controller 304, nonvolatile memory 305, disk controller 306, flash disk 307, and LAN I/F 202.

The CPU 301 controls the entire mainboard 300. The boot ROM 302 stores a boot program etc. The memory 303 is used as a work memory of the CPU 301. The bus controller 304 has a bridge function with an external bus. The nonvolatile memory 305 is a storage device that holds data even if the power supply to the controller 201 is stopped. The disk controller 306 controls reading and writing of data in the auxiliary storage device 211. The flash disk 307 is a storage device that has a relatively small capacity and consists of semiconductor devices.

The scanner 203 and printer 206 are connected to the subboard 308. The subboard 308 is a relatively small-scale general-purpose CPU system and is image processing hardware. The subboard 308 is provided with a CPU 309, a memory 310, a bus controller 311, a nonvolatile memory 312, an image processor 313, and a device controller 314.

The CPU 309 controls the entire subboard 308. The memory 310 is used as a work memory of the CPU 309. The bus controller 311 has a bridge function with an external bus. The nonvolatile memory 312 is a storage device that holds data even if the power supply to the controller 201 is stopped. The image processor 313 performs a real-time digital image process. The device controller 314 transmits image data for print that has been processed by the image processor 313 to the printer 206, for example.

Figure 4A:
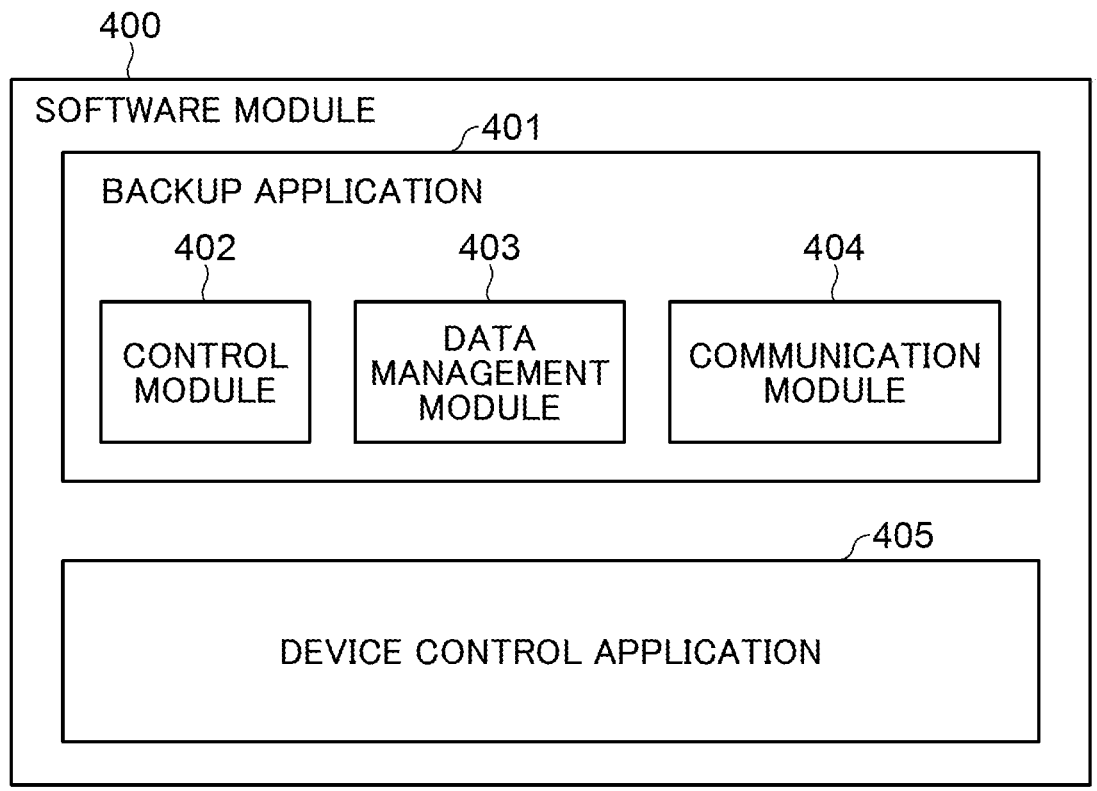
FIG. 4A and FIG. 4B are block diagrams schematically showing a software configuration of the communication system in FIG. 1.
Figure 4B:
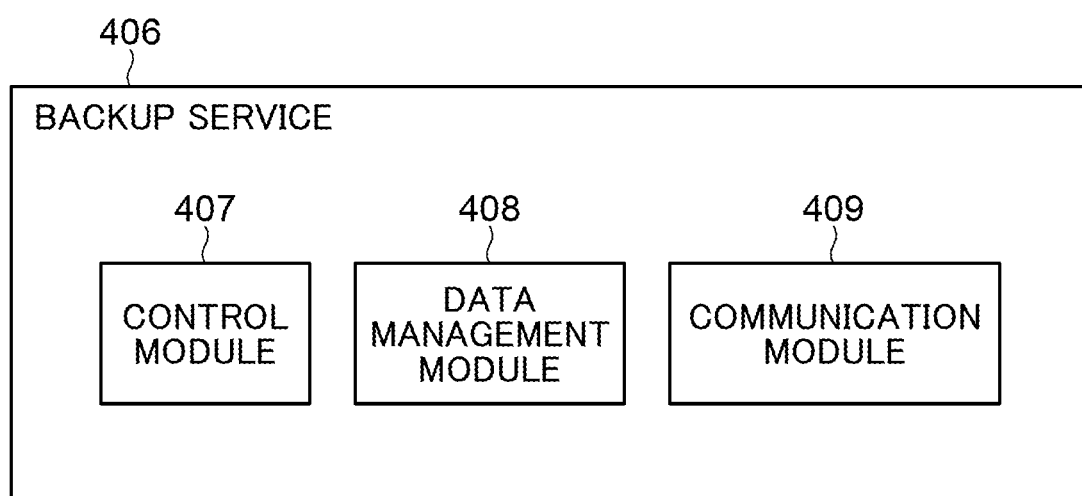

FIG. 4A and FIG. 4B are block diagrams schematically showing a software configuration of the communication system 100 in FIG. 1. The image forming apparatuses 102, 102a, 102b, and 102c have the same software configuration, and the software configuration of the image forming apparatus 102 will be described as an example. Moreover, modules of the image forming apparatuses 102a, 102b, and 102c corresponding to a module of the image forming apparatus 102 are indicated by signs that "a", "b", and "c" are added to the end of the sign of the module of the image forming apparatus 102 in the following description. FIG. 4A shows a configuration of a software module 400 of the image forming apparatus 102. FIG. 4B shows a configuration of a backup service 406 of the network device 101.

As shown in FIG. 4A, the software module 400 is provided with a backup application 401 and a device control application 405 as modules. Each process of the software module 400 is executed when the controller 201 runs a program stored in the auxiliary storage device 211.

The backup application 401 is provided with a control module 402, data management module 403, and communication module 404. The control module 402 performs various processes according to instructions received through the operation unit 210. The data management module 403 manages the data stored in the auxiliary storage device 211. For example, when data is backed up to the network device 101, the data management module 403 reads setting data about various functions of the image forming apparatus that is a backup target from the auxiliary storage device 211. The communication module 404 controls communication with an external apparatus through the LAN I/F 202. For example, the communication module 404 transmits the setting data that the data management module 403 has read as backup data to the network device 101. The device control application 405 controls the scanner 203, printer 206, and operation unit 210.

As shown in FIG. 4B, the backup service 406 is provided with a control module 407, data management module 408, and communication module 409. The control module 407 instructs execution of a service that is provided by the backup service 406 and performs a process instructed from the image forming apparatuses 102, 102a, 102b, and 102c. The network device 101 provides data storage areas (henceforth "customer tenant areas") that are different for respective customers and stores backup data of a specific customer in the corresponding data storage area to prevent an unauthorized access. When the backup data of the image forming apparatus 102a is stored, for example, the data management module 408 generates a storage area in a customer tenant area on the basis of serial information about the image forming apparatus 102a and stores the backup data of the image forming apparatus 102a in the storage area concerned. The serial information about the image forming apparatus 102a is the serial number uniquely allocated to the image forming apparatus 102a, for example. The communication module 409 controls data communication with an external apparatus.

Figure 5:
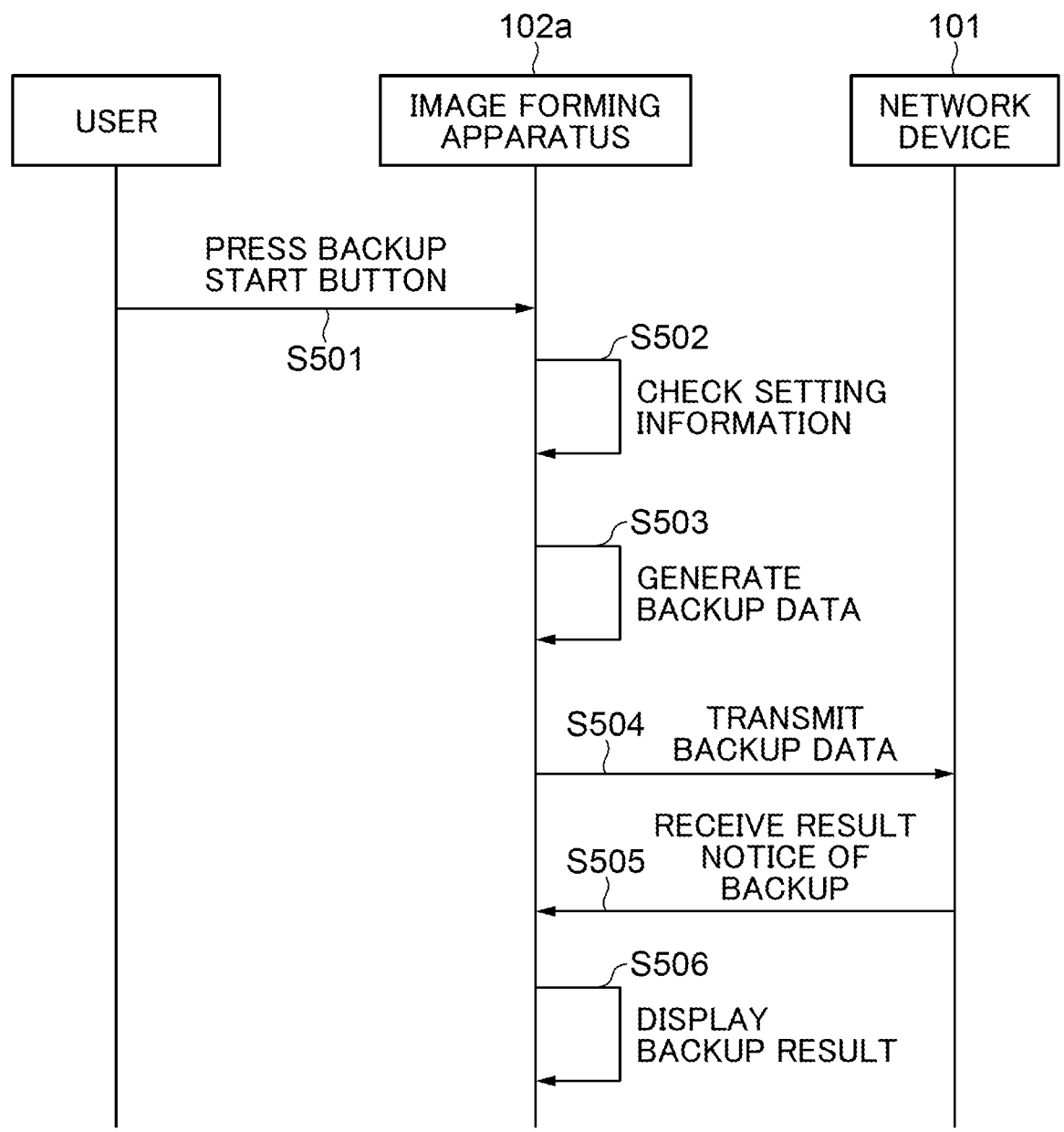
FIG. 5 is a sequence chart showing procedures of a backup process executed by the communication system in FIG. 1.
Figure 6A:
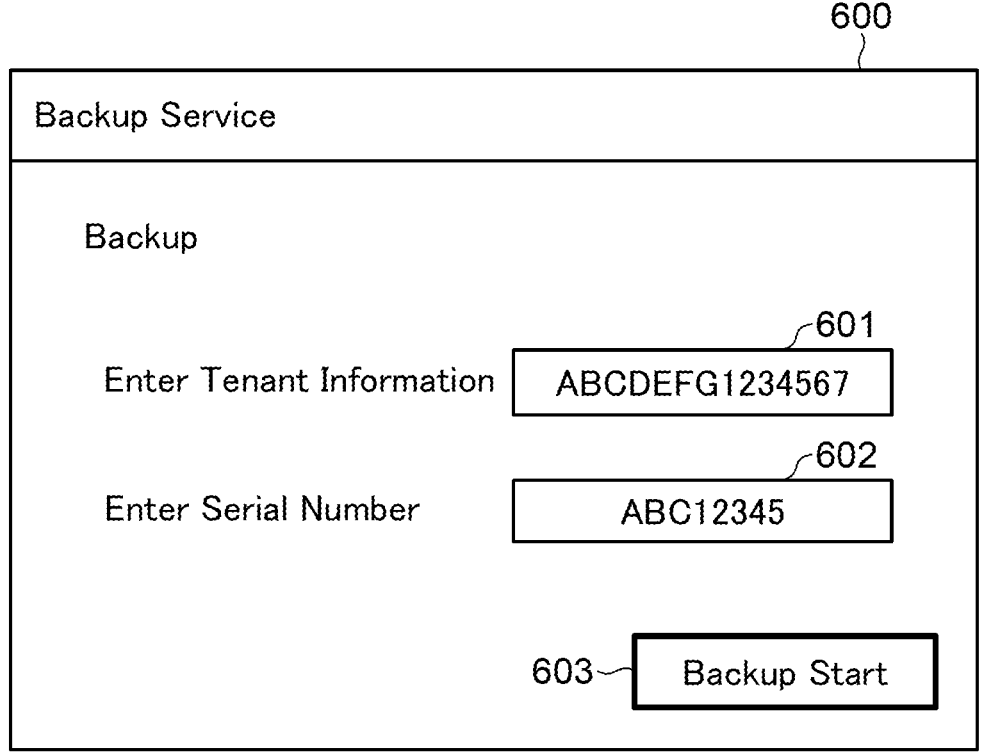
FIG. 6A and FIG. 6B are views showing examples of backup setting screens displayed on an operation unit of the backup source apparatus in the embodiment.

FIG. 5 is a sequence chart showing procedures of a backup process executed by the communication system 100 in FIG. 1. Hereinafter, a process that backs up the setting data of the image forming apparatus 102a that is a backup source apparatus will be described as an example. When backing up the setting data of the image forming apparatus 102a, a user instructs start of the backup process from a backup setting screen 600 shown in FIG. 6A displayed on the operation unit 210a of the image forming apparatus 102a. The backup setting screen 600 includes a tenant information entry column 601, serial number entry column 602, and backup start button 603. A character string showing a customer tenant area is entered into the tenant information entry column 601. The serial information about the image forming apparatus 102a is entered into the serial number entry column 602. When the user presses the backup start button 603, the image forming apparatus 102a starts the backup process of the data used as the backup target of the image forming apparatus 102a concerned.

As shown in FIG. 5, when the user presses the backup start button 603 in the backup setting screen 600 displayed on the operation unit 210a (step S501), the image forming apparatus 102a checks setting information about a backup destination (step S502). Specifically, the image forming apparatus 102a checks the setting information about the backup service 406 of the network device 101 that becomes the backup destination. Next, the image forming apparatus 102a generates backup data including data as a backup target of the image forming apparatus 102a (step S503) and transmits the backup data concerned to the network device 101 (step S504).

Figure 6B:
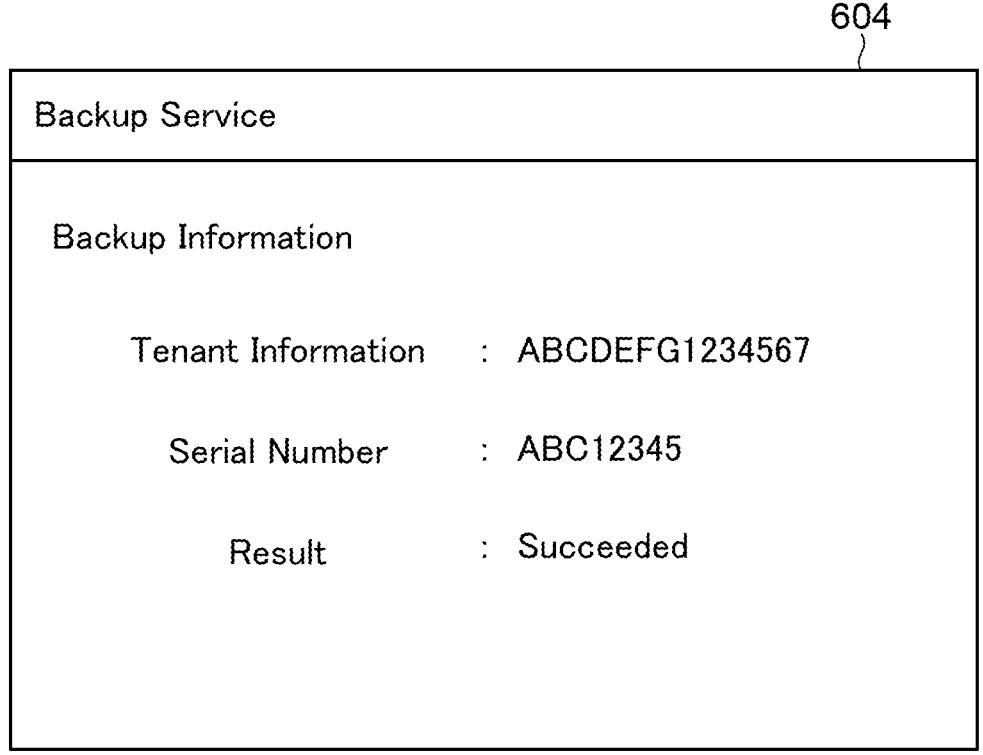

Next, when receiving a result notice of the backup from the network device 101 (step S505), the image forming apparatus 102a displays a backup result on the operation unit 210a according to the result notice received (step S506). For example, when the backup process has succeeded, a backup result screen 604 shown in FIG. 6B is displayed on the operation unit 210a. The backup result screen 604 includes the information showing the customer tenant area of the backup destination, the serial number of the image forming apparatus 102a, and the information showing the backup result. After that, the image forming apparatus 102a finishes this process. In the embodiment, the same process is performed also in the image forming apparatuses 102b and 102c, and the respective backup data of the image forming apparatuses 102a, 102b, and 102c are held by the network device 101.

Figure 7:
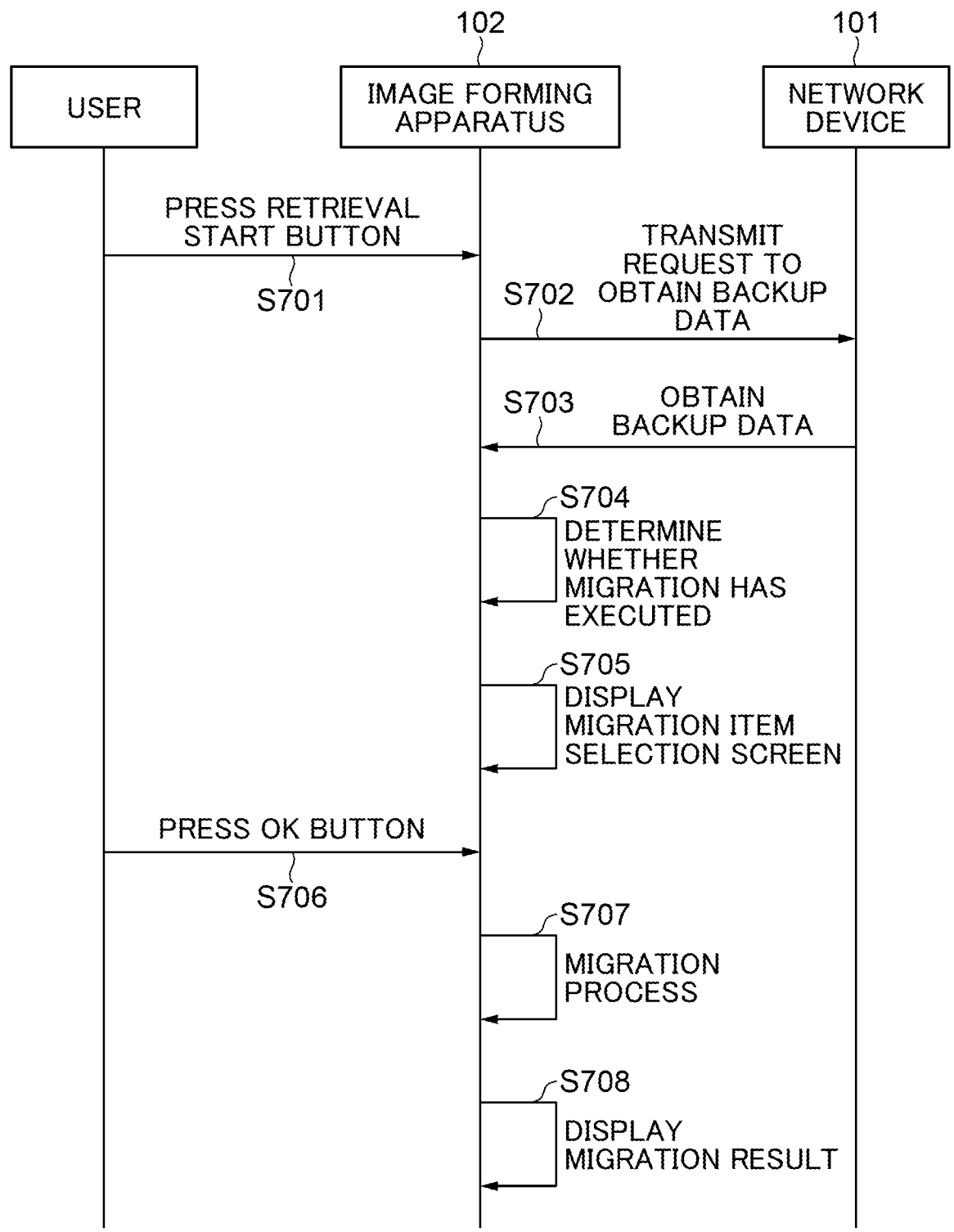
FIG. 7 is a sequence chart showing procedures of a migration process executed by the communication system in FIG. 1.

FIG. 7 is a sequence chart showing procedures of a migration process executed by the communication system 100 in FIG. 1. Hereinafter, the process that sets up the setting values included in the backup data held by the network device 101 to the image forming apparatus 102 will be described as an example. When setting up the setting values included in the backup data held by the network device 101 to the image forming apparatus 102, the user instructs the start of the migration process from a migration setting screen 800 shown in FIG. 8A displayed on the operation unit 210 of the image forming apparatus 102. The migration setting screen 800 includes a tenant information entry column 801, serial number entry column 802, and retrieval start button 803. A character string showing the customer tenant area in which the migrated backup data is stored is entered into the tenant information entry column 801. The serial information about the backup source apparatus of the backup data that will be migrated (the serial information about the image forming apparatus 102a, for example) is entered into the serial number entry column 802. When the user presses the retrieval start button 803, the image forming apparatus 102 transmits a retrieval request of backup data to the network device 101.

As shown in FIG. 7, the user presses the retrieval start button 803 in the migration setting screen 800 displayed on the operation unit 210 (step S701), the image forming apparatus 102 transmits the retrieval request of backup data to the network device 101. When receiving the retrieval request, the network device 101 transmits list information about the backup data corresponding to the information entered into the tenant information entry column 801 and serial number entry column 802 to the image forming apparatus 102. The image forming apparatus 102 displays a retrieval result screen 804 shown in FIG. 8B on the operation unit 210 on the basis of the received list information.

The retrieval result screen 804 includes a migration information column 805, backup data list 806, and migration start button 807. The information about date and time of the last execution of migration and an execution result is displayed in the migration information column 805. The list information about the backup data corresponding to the information entered into the tenant information entry column 801 and serial number entry column 802 is displayed as a backup data list 806. In the backup data list 806, execution date and time of each backup is displayed as information that identifies each backup data. The user is able to select one backup data from the backup data list 806. The migration start button 807 is a button to instruct start of migration.

When the user presses the migration start button 807 in a state where one backup data is selected from the backup data list 806, the image forming apparatus 102 performs a process in step S702. In the step S702, the image forming apparatus 102 transmits a request to obtain the selected backup data to the network device 101. When obtaining the backup data corresponding to the above-mentioned obtainment request from the network device 101 (step S703), the image forming apparatus 102 obtains a migration history that is managed by the backup application 401. The migration history is data for managing an execution status of the migration. The image forming apparatus 102 determines whether the image forming apparatus 102 has executed the migration on the basis of the obtained migration history (step S704).

When the image forming apparatus 102 has executed the migration, the image forming apparatus 102 displays a migration item selection screen 808 shown in FIG. 8C on the basis of the obtained backup data (step S705). The migration item selection screen 808 includes a migration item selection area 809 and an OK button 810. Setting categories to which a plurality of setting values included in the obtained backup data belong are displayed in the migration item selection area 809. The user is able to select at least one category (hereinafter referred to as a "migration target category") corresponding to at least one setting value that is migrated by selecting a check box of a desired setting category in the migration item selection area 809. When the user presses the OK button 810, the setting in the migration item selection area 809 is reflected.

When the user presses the OK button 810 in a state where at least one check box in the migration item selection area 809 is selected (step S706), the image forming apparatus 102 executes the migration process (step S707). In the step S707, the image forming apparatus 102 sets up only the setting value(s) corresponding to at least one setting category selected in the migration item selection area 809 among the setting values included in the backup data obtained from the network device 101, for example. Next, the image forming apparatus 102 displays a migration result on the operation unit 210 (step S708). For example, when the migration succeeded, a migration result screen 811 shown in FIG. 8D is displayed on the operation unit 210. The migration result screen 811 includes information showing execution date of the migration and an execution result. After that, the image forming apparatus 102 finishes this process.

In the embodiment, the process in FIG. 7 is performed for every backup data used for migration and the migration target categories of each backup data are selected by a user. Thus, the image forming apparatus 102 obtains the setting values of the different setting categories from the plurality of backup data received from the network device 101 and sets up the obtained setting values. For example, the image forming apparatus 102 obtains a setting value of a basic setting from the backup data of the image forming apparatus 102a received from the network device 101. Moreover, the image forming apparatus 102 obtains a setting value of an individual setting from the backup data of the image forming apparatus 102b received from the network device 101. Furthermore, the image forming apparatus 102 obtains a setting value of an address book from the backup data of the image forming apparatus 102c received from the network device 101. The image forming apparatus 102 sets up the respective setting values obtained.

Figure 9:
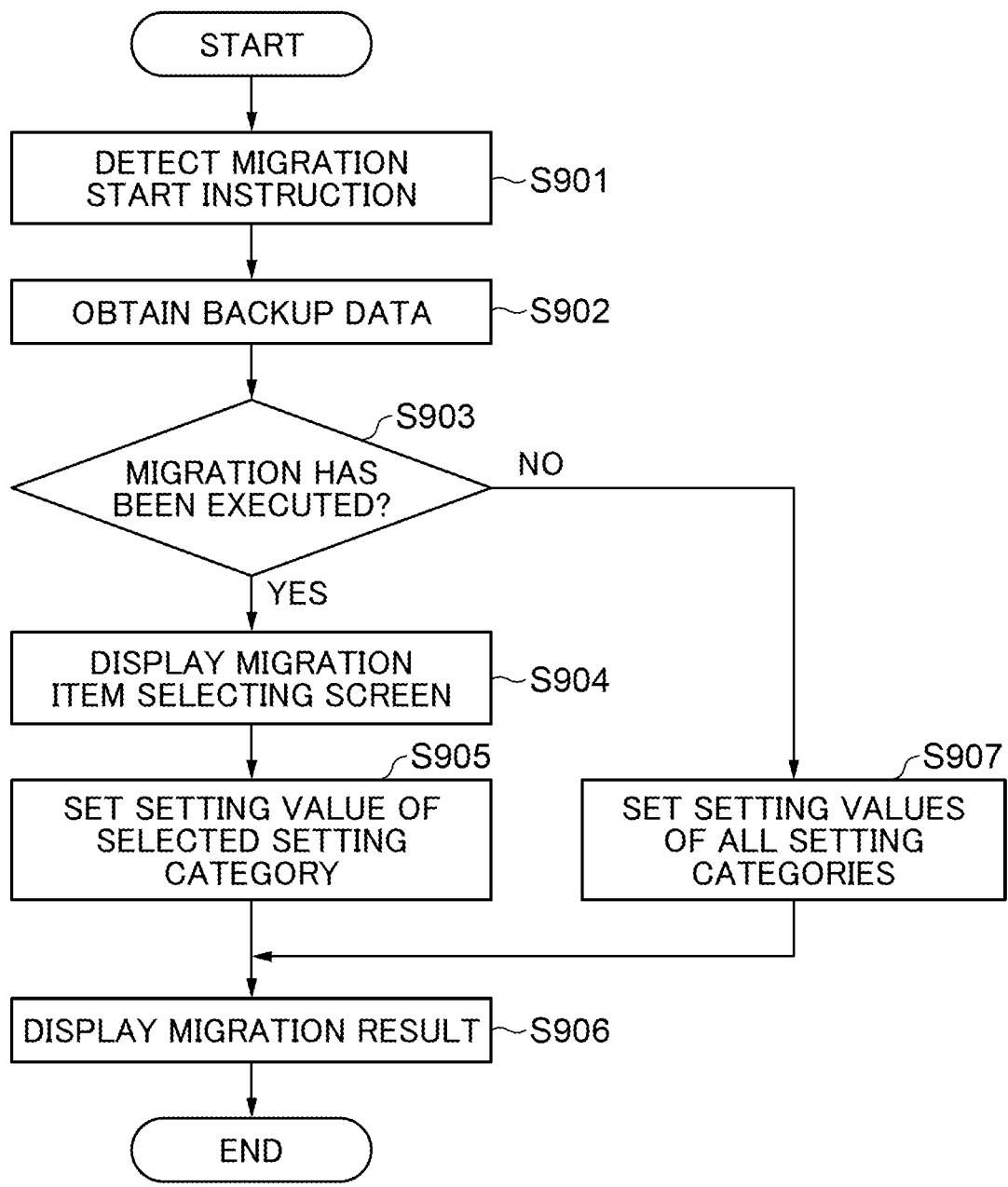
FIG. 9 is a flowchart for describing a process in steps S702 through S707 in FIG. 7 in detail.

FIG. 9 is a flowchart for describing the process in the steps S702 through S707 in FIG. 7 in detail. The process in FIG. 9 is performed by the backup application 401 of the image forming apparatus 102.

In FIG. 9, when a user presses the migration start button 807 as mentioned above, the backup application 401 detects a migration start instruction (step S901). Next, the backup application 401 transmits an obtainment request of backup data selected in the backup data list 806 to the network device 101 (see the step S702, for example). When receiving the backup data corresponding to the above-mentioned obtainment request from the network device 101 in step S902 (see the step S703, for example), the backup application 401 executes a process in step S903. In the step S903, the backup application 401 determines whether the image forming apparatus 102 has executed the migration (see the step S704, for example).

As a result of the determination in the step S903, when the migration has been executed, the backup application 401 displays the migration item selection screen 808 on the operation unit 210 in step S904 (see the step S705, for example). It should be noted that a setting category that has been subjected to the migration in the past may not be displayed in the step S904 in this embodiment. Next, the backup application 401 sets up only the setting value(s) corresponding to the at least one setting category selected in the migration item selection area 809 among the setting values included in the obtained backup data (step S905). Next, the backup application 401 displays a migration result on the operation unit 210 in step S906 (see the step S708, for example), and finishes this process.

As a result of the determination in the step S903, when the image forming apparatus 102 has not executed the migration, the backup application 401 sets up the setting values of all the setting categories of the obtained backup data (step S907). After that, the backup application 401 finishes this process.

According to the above-mentioned embodiment, the image forming apparatus 102 obtains the setting value(s) of the basic setting from the backup data of the image forming apparatus 102a received from the network device 101. Moreover, the image forming apparatus 102 obtains a setting value of an individual setting from the backup data of the image forming apparatus 102b received from the network device 101. Furthermore, the image forming apparatus 102 obtains a setting value of an address book from the backup data of the image forming apparatus 102c received from the network device 101. The image forming apparatus 102 sets up the respective setting values obtained. Thereby, the setting values of the different setting categories are migrated to the image forming apparatus 102 from the respective backup data of the image forming apparatuses 102a, 102b, and 102c.

Moreover, in the above-mentioned embodiment, a migration target category is selected by a user for every backup data received from the network device 101. Thereby, the user is able to select the setting value(s) of the desired setting category from the backup data received from the network device 101 and to set the selected setting value(s) to the image forming apparatus 102.

In the embodiment mentioned above, when a user instructs the migration, a migration target category is selected by the user for every backup data used in the migration. Thereby, the migration process complying with a user's demand can be performed about the referring source of the setting value.

Although the present invention is described with the embodiment mentioned above, the present invention is not limited to the embodiment mentioned above. For example, the process in FIG. 9 may be changed so as to display the migration item selection screen 808 on the operation unit 210 regardless of whether the image forming apparatus 102 has executed the migration.

Moreover, although user's selection of a migration target category or selection of all setting categories is determined on the basis of whether the image forming apparatus 102 has executed the migration in the embodiment mentioned above, the determination may be performed by another method. For example, the image forming apparatus 102 may determine one of them mentioned above on the basis of predetermined setting information. The setting information concerned shows user's selection of a migration target category or selection of all setting categories.

In the embodiment mentioned above, the migration history may be implemented so that it may be cleared by a specific clear process of the image forming apparatus 102.

Although the backup application 401 of the image forming apparatus 102 determines whether to display the migration item selection screen 808 in the embodiment mentioned above, the backup service 406 of the network device 101 may perform this determination. When the image forming apparatus 102 transmits the migration history to the network device 101 in the step S702, the backup service 406 is able to determine whether to display the migration item selection screen 808.

In the embodiment mentioned above, when a user instructs backup to a backup source apparatus, for example, the image forming apparatus 102a, the migration item selection screen 808 may be displayed on the operation unit 210a of the image forming apparatus 102a.

When a user sets up a migration target category for every backup data used for migration at a time of a migration instruction as mentioned above, migration target categories of a plurality of backup data are set up at once, which causes time and effort in the setting.

In light of this problem, when a user instructs backup, the migration item selection screen 808 is displayed on the operation unit of the backup source apparatus, for example, the image forming apparatus 102a, to allow the user to select a migration target category in the embodiment.

Figure 10:
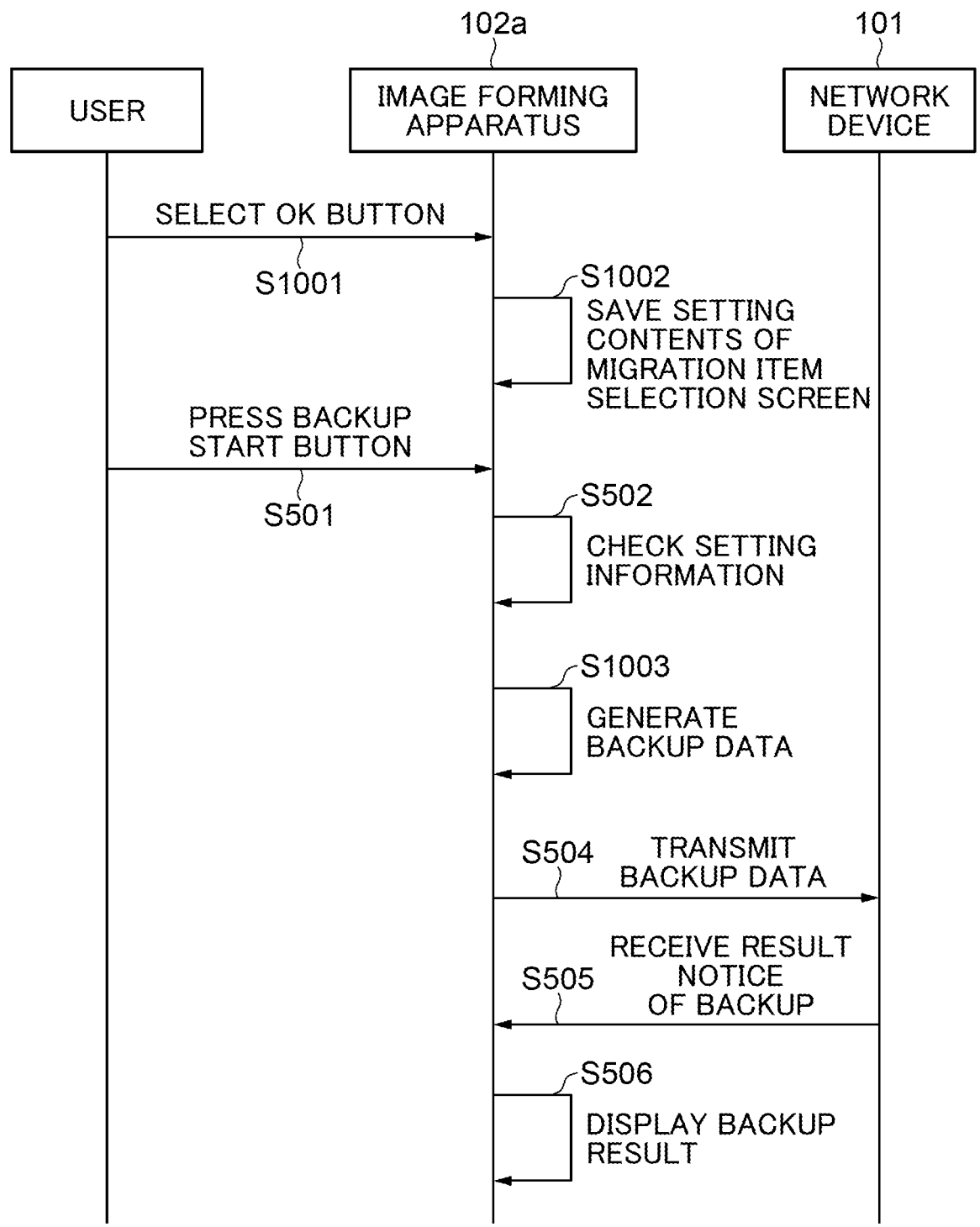
FIG. 10 is a sequence chart showing procedures of a modified example of the backup process in FIG. 5.

FIG. 10 is a sequence chart showing procedures of a modified example of the backup process in FIG. 5. Hereinafter, a process that backs up the setting data of the image forming apparatus 102a will be described as an example. A user is able to select a migration item from the migration item selection screen 808 displayed on the operation unit 210a.

As shown in FIG. 10, when the user selects the OK button 810 of the migration item selection screen 808 displayed on the operation unit 210a (step S1001), the image forming apparatus 102a performs a process in step S1002. In the step S1002, the image forming apparatus 102a saves setting contents of the migration item selection screen 808.

Next, when the user presses the backup start button 603 in the backup setting screen 600 displayed on the operation unit 210a in the step S501, the image forming apparatus 102a performs the process in the step S502. Next, the image forming apparatus 102a generates the backup data of the image forming apparatus 102a by adding a migration target flag (selection item information) that shows the setting contents of the migration item selection screen 808 (step S1003). It should be noted that the migration target flag may be added to each setting value in the migration target category in the backup data, or may include information showing the migration target category in the embodiment. Next, the image forming apparatus 102a performs the process from the step S504.

Figure 11:
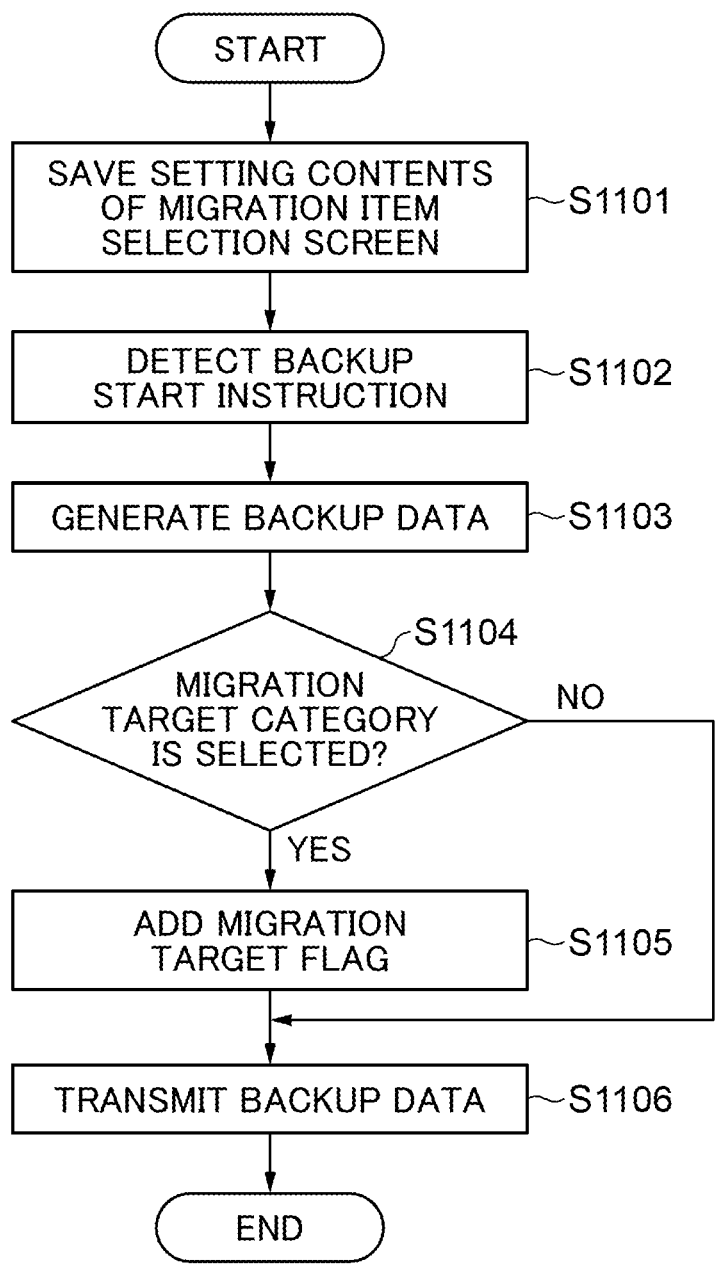
FIG. 11 is a flowchart for describing a process in steps S1001 through S504 in FIG. 10 in detail.

FIG. 11 is a flowchart for describing a process in the steps S1001 through S504 in FIG. 10 in detail. The process in FIG. 11 is performed by the backup application 401 of the image forming apparatus 102A.

As shown in FIG. 11, when the user selects the OK button 810 in the migration item selection screen 808, the backup application 401a saves the setting contents of the migration item selection screen 808 in step S1101 (see the step S1002). Next, when the user presses the backup start button 603 of the backup setting screen 600 displayed on the operation unit 210a, the backup application 401a detects a backup start indication (step S1102).

Next, the backup application 401a checks the setting information about the backup service 406 of the network device 101 used as a backup destination (see the step S502, for example). Next, the backup application 401a generates the backup data of the image forming apparatus 102a (step S1103). Next, the backup application 401a determines whether the user has selected the migration target category in the setting of the migration item selection screen 808 (step S1104).

As a result of the determination in the step S1104, when the user has not selected the migration target category, the backup application 401a executes a process in step S1106 mentioned later. As a result of the determination in the step S1104, when the user has selected the migration target category, the backup application 401a executes a process in step S1105. In the step S1105, the backup application 401a adds the migration target flag showing the migration target category that the user has selected to the backup data generated in the step S1102.

Next, the backup application 401a transmits the backup data to the network device 101 (step S1106). For example, when the user has selected the migration target category, the backup application 401a transmits the backup data to which the migration target flag is added to the network device 101. In the meantime, when the user has not selected the migration target category, the backup application 401a transmits the backup data to which the migration target flag is not added to the network device 101. After that, the backup application 401a finishes this process.

In the embodiment, the image forming apparatuses 102b and 102c also perform the above-mentioned process in FIG. 11 when backing up the backup data. Thereby, the network device 101 holds the backup data of the image forming apparatuses 102a, 102b, and 102c to which the migration target categories are added.

Figure 12:
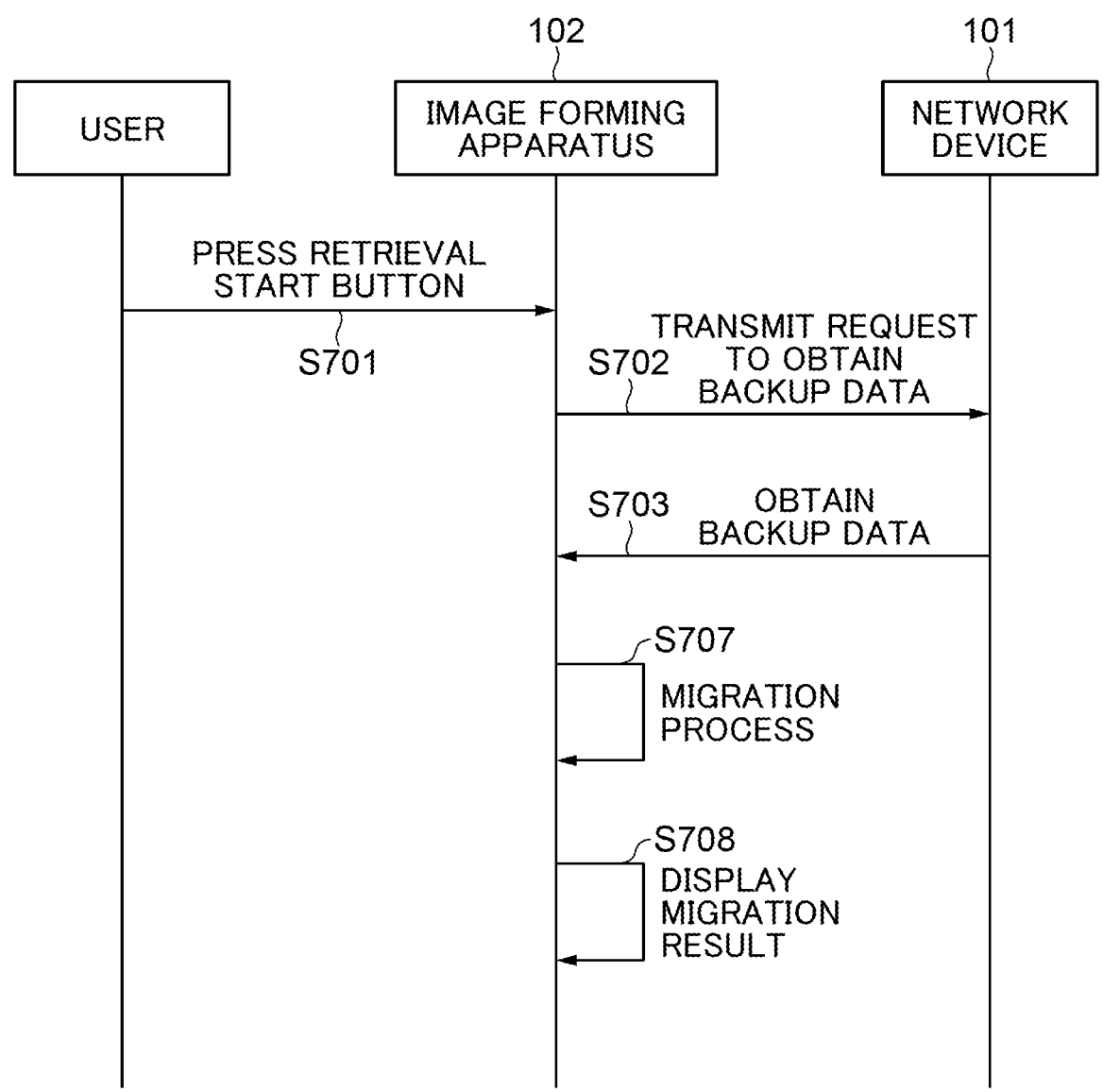
FIG. 12 is a sequence chart showing procedures of a modified example of the migration process in FIG. 7.

FIG. 12 is a sequence chart showing procedures of a modified example of the migration process in FIG. 7. Hereinafter, the process that sets up the setting values included in the backup data held by the network device 101 to the image forming apparatus 102 will be described as an example.

When the user presses the retrieval start button 803 in the migration setting screen 800 displayed on the operation unit 210 in the step S701 in FIG. 12, the image forming apparatus 102 executes the processes in the steps S702 and S703. Next, the image forming apparatus 102 executes the processes in the steps S707 and S708 without displaying the migration item selection screen on the operation unit 210.

Figure 13:
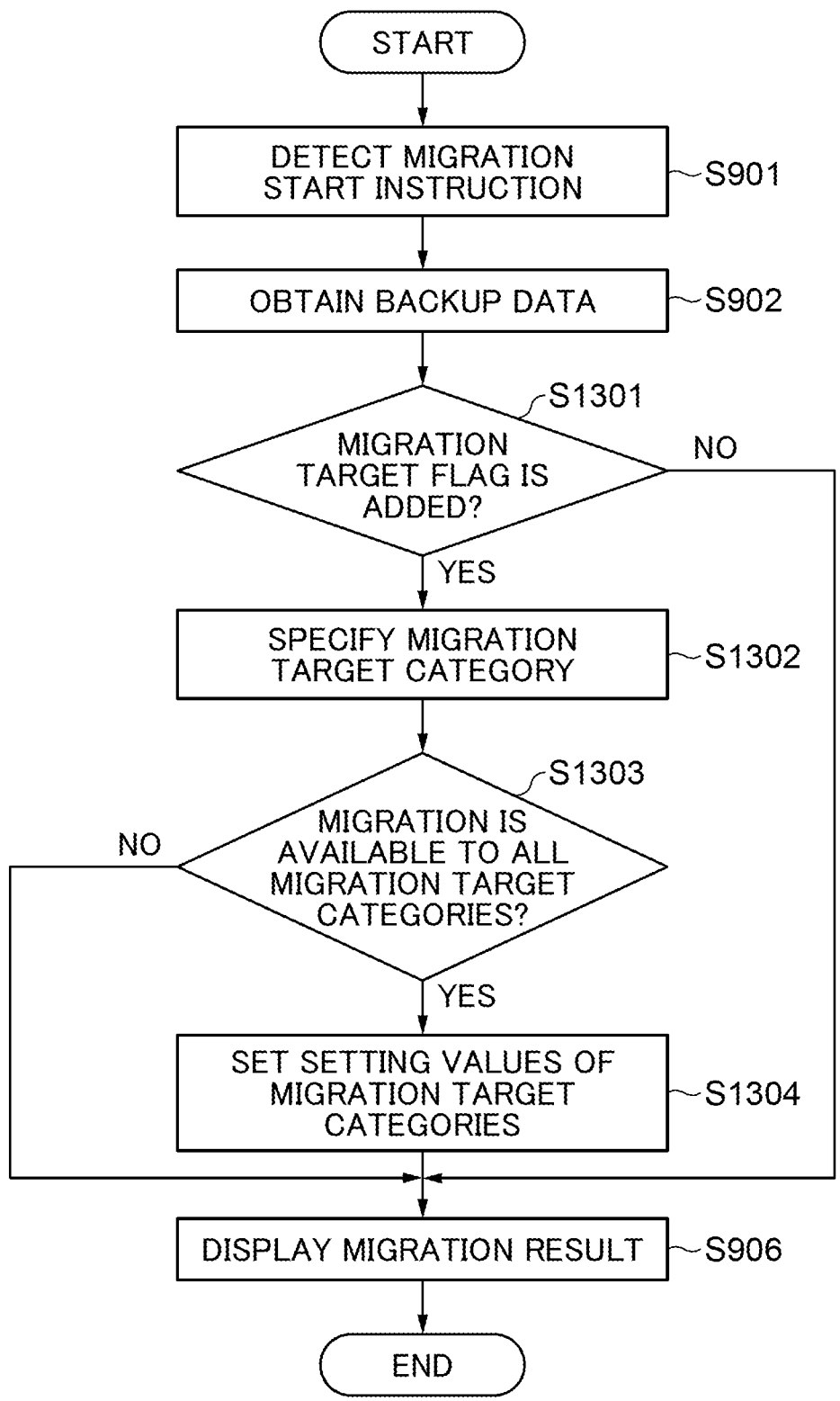
FIG. 13 is a flowchart for describing a process in steps S702 through S707 in FIG. 12 in detail.

FIG. 13 is a flowchart for describing the process in the steps S702 through S707 in FIG. 7 in detail. The process in FIG. 13 is performed by the backup application 401 of the image forming apparatus 102.

As shown in FIG. 13, the backup application 401 executes the processes in the steps S901 and S902. Next, the backup application 401 determines whether the migration target flag is added to the backup data obtained from the network device 101 (step S1301).

As a result of the determination in the step S1301, when the migration target flag is not added to the above-mentioned backup data, the backup application 401 executes the process from the step S906. As a result of the determination in the step S1301, when the migration target flag is added to the above-mentioned backup data, the backup application 401a executes a process in step S1302. In the step S1302, the backup application 401 specifies at least one migration target category on the basis of the migration target flag. Next, the backup application 401 determines whether the migration is available to all the migration target categories (step S1303). In the step S1303, when the migration target categories include a setting category that has been migrated to the image forming apparatus 102, for example, it is determined that the migration is available to not all the migration target categories. In the meantime, when the migration target categories do not include a setting category that has been migrated to the image forming apparatus 102, it is determined that the migration is available to all the migration target categories.

As a result of the determination in the step S1303, when the migration is available to all the migration target categories, the backup application 401 sets the setting values of the migration target categories to the image forming apparatus 102 (step S1304). Next, the backup application 401 executes the process in the step S906.

As a result of the determination in the step S1303 when the migration is available to not all the migration target categories, the backup application 401 executes the process in the step S906 without executing the process in the step S1304.

In the embodiment mentioned above, when the user instructs the backup, the user selects a migration target category of backup data that is backed up. Thereby, the time and effort of the user of setting up migration target categories to respective backup data at the time of instructing the migration can be reduced.

Moreover, in the embodiment mentioned above, when receiving the instruction to back up backup data, the network device 101 holds the backup data to which the migration target flag is added. The image forming apparatus 102 obtains the setting value of the setting category that the migration target flag shows from the above-mentioned backup data received from the network device 101 and sets up the setting value concerned. Thereby, even when the user selects the migration target category at the time of backing up the backup data to the network device 101, the setting values of the different setting categories are migrated to the image forming apparatus 102 from the respective backup data of the image forming apparatuses 102a, 102b, and 102c.

Figure 14:
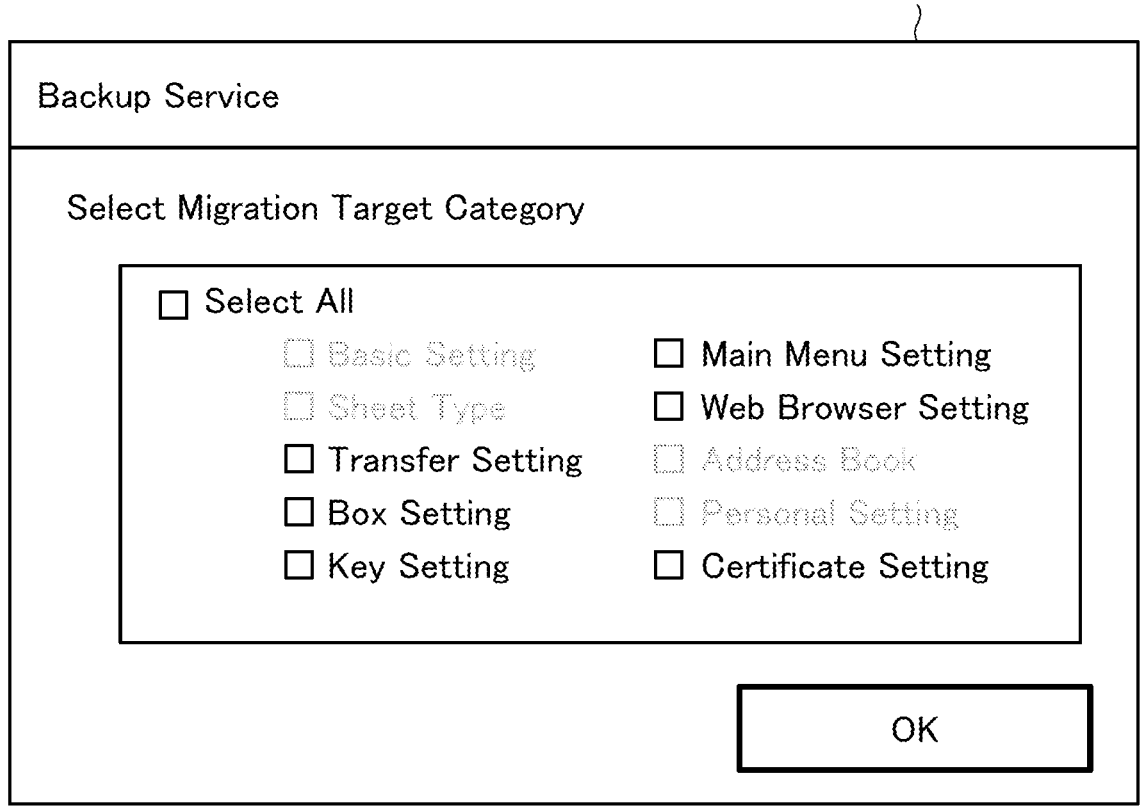
FIG. 14 is a view showing an example of a migration setting screen displayed on the operation unit of the communication device in the embodiment.

In the embodiment mentioned above, when the migration is available to not all the migration target categories as a result of the determination in the step S1303, a migration item selection screen 1401 shown in FIG. 14 may be displayed on the operation unit 210 before executing the process in the step S906. In the migration item selection screen 1401, the setting categories that have been migrated to the image forming apparatus 102 are displayed in gray so that a user cannot select. The user is able to select a setting category to which the migration is available in the migration item selection screen 1401.

As a result of the determination in the step S1301, when the migration target flag is not added to the backup data, the process from the step S903 may be performed in the embodiment mentioned above.

Although the embodiment mentioned above describes the case where all of the communication apparatus and backup source apparatuses that constitute the communication system 100 are the image forming apparatuses equipped with the same functions, the respective apparatuses may have different functions. For example, the image forming apparatus 102 may be a multifunction apparatus equipped with a plurality of functions including a scanner function and a color print function, the image forming apparatus 102a may be a color multifunction apparatus equipped with a scanner function and a color print function, the image forming apparatus 102b may be a monochrome multifunction apparatus equipped with a scanner function and a monochrome print function, and the image forming apparatus 102c may be a printer equipped with only a print function.

Although the embodiment mentioned above described the case where the present invention is applied to the image forming apparatuses, the target of the present invention is not limited to the image forming apparatuses. The present invention is applicable to apparatuses, such as a smart phone, a tablet terminal, and a PC, that communicate with an external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-051430, filed Mar. 19, 2019, which is hereby incorporated by reference herein in its entirety.

What is claimed is:

1. A communication system comprising:
a management apparatus that manages a plurality of backup data corresponding to settings of a plurality of backup source apparatuses including a first backup source apparatus and a second backup source apparatus, the management apparatus comprising:
a first memory device that stores a set of instructions; and
at least one processor that executes the set of instructions stored in the first memory device to:
hold first backup data obtained from the first backup source apparatus, the first backup data including a first setting value of a first setting item;
hold second backup data obtained from the second backup source apparatus, the second backup data including a second setting value of a second setting item; and
a communication apparatus that communicates with the management apparatus, the communication apparatus comprising:
a display device configured to display information;
a second memory device that stores a set of instructions; and
at least one processor that executes the set of instructions stored in the second memory device to:
cause the display device to display list information of the plurality of backup data;
accept an instruction for designating backup data, from the list information of the plurality of backup data, to be used for migration processing, in which the designated backup data is migrated to the communication apparatus, and execute the migration processing based on the designated backup data, the designated backup data including first designated backup data from among the first backup data obtained from the first backup source apparatus and second designated backup data from among the second backup data obtained from the second backup source apparatus;
wherein, after the migration processing is executed based on the first designated backup data from among the first backup data obtained from the first backup source apparatus and the second designated backup data from among the second backup data obtained from the second backup source apparatus, the communication apparatus holds (i) a third setting value of a third setting item that is the same as the first setting value of the first setting item included in the first backup data of the first backup source apparatus and (ii) a fourth setting value of a fourth setting item that is the same as the second setting value of the second setting item included in the second backup data of the second backup source apparatus.

2. The communication system according to claim 1, wherein the at least one processor of the communication apparatus executes instructions in the second memory device to:
   allow a user to select the first setting item from among a first plurality of setting items constituting the first backup data, and
   allow the user to select the second setting item from among a second plurality of setting items constituting the second backup data.

3. The communication system according to claim 2, wherein the at least one processor of the communication apparatus executes instructions in the second memory device to allow the user to select the first setting item and the second setting item in a case where the user instructs migration.

4. The communication system of the claim 2, wherein the at least one processor of the communication apparatus executes instructions in the second memory device to allow the user to select the first setting item and the second setting item in a case where the user instructs backup.

5. The communication system of the claim 4, wherein the at least one processor of the management apparatus executes instructions in the first memory device to add selection item information showing the first setting item and the second setting item selected by the user to the first backup data and the second backup data, respectively, when the user instructs backup, and
   wherein the at least one processor of the communication apparatus executes instructions in the second memory device to:
   receive the first backup data and the second backup data to which the selection item information is added,
   obtain the third setting value of the third setting item that is the same as the first setting value of the first setting item shown by the selection item information from the first backup data,
   obtain the fourth setting value of the fourth setting item that is the same as the second setting value of the second setting item shown by the selection item information from the second backup data, and
   set up the third setting value and the fourth setting value.

6. The communication system according to claim 1, wherein the communication apparatus includes (i) the obtained and set up third setting value of the third setting item, which is different from the fourth setting item, from the first backup data obtained from the first backup source apparatus and (ii) the obtained and set up fourth setting value of the fourth setting item, which is different from the third setting item, from the second backup data obtained from the second backup source apparatus different from the first backup source apparatus.

7. A control method for a communication system equipped with a management apparatus that manages a plurality of backup data corresponding to settings of a plurality of backup source apparatuses including a first backup source apparatus and a second backup source apparatus and a communication apparatus that has a display device configured to display information and that communicates with the management apparatus, the control method comprising:
   holding first backup data obtained from the first backup source apparatus by the management apparatus, the first backup data including a first setting value of a first setting item;
   holding second backup data obtained from the second backup source apparatus by the management apparatus, the second backup data including a second setting value of a second setting item;
   causing, by the communication apparatus, the display device to display list information of the plurality of backup data; and
   accepting, by the communication apparatus, an instruction for designating backup data, from the list information of the plurality of backup data, to be used for migration processing, in which the designated backup data is migrated to the communication apparatus, and executing the migration processing based on the designated backup data, the designated backup data including first designated backup data from among the first backup data obtained from the first backup source apparatus and second designated backup data from among the second backup data obtained from the second backup source apparatus,
   wherein, after the migration processing is executed based on the first designated backup data from among the first backup data obtained from the first backup source apparatus and the second designated backup data from among the second backup data obtained from the second backup source apparatus, the communication apparatus holds (i) a third setting value of a third setting item that is the same as the first setting value of the first setting item included in the first backup data of the first backup source apparatus and (ii) a fourth setting value of a fourth setting item that is the same as the second setting value of the second setting item included in the second backup data of the second backup source apparatus.

8. A non-transitory computer-readable storage medium storing a control program causing a computer to execute a control method for a communication systems equipped with a management apparatus that manages a plurality of backup data corresponding to settings of a plurality of backup source apparatuses including a first backup source apparatus and a second backup source apparatus and a communication apparatus that has a display device configured to display information and that communicates with the management apparatus, the control method comprising:
   holding first backup data obtained from the first backup source apparatus by the management apparatus, the first backup data including a first setting value of a first setting item;
   holding second backup data obtained from the second backup source apparatus by the management apparatus, the second backup data including a second setting value of a second setting item;
   causing, by the communication apparatus, the display device to display list information of the plurality of backup data; and
   accepting, by the communication apparatus, an instruction for designating backup data, from the list information of the plurality of backup data, to be used for migration processing, in which the designated backup data is migrated to the communication apparatus, and executing the migration processing based on the designated backup data, the designated backup data including first designated backup data from among the first backup data obtained from the first backup source apparatus and second designated backup data from among the second backup data obtained from the second backup source apparatus, wherein, after the migration processing is executed based on the first designated backup data from among the first backup data obtained from the first backup source apparatus and the second designated backup data from among the second backup data obtained from the second backup source apparatus, the communication apparatus holds (i) a third setting value of a third setting item that is the same as the first setting value of the first setting item included in the first backup data of the first backup source apparatus and (ii) a fourth setting value of a fourth setting item that is the same as the second setting value of the second setting item included in the second backup data of the second backup source apparatus.

9. The communication system according to claim 1, wherein the at least one processor of the communication apparatus executes instructions in the second memory device to display a first screen including a first plurality of setting items corresponding to the first backup data obtained from the first backup source apparatus and to display a second screen including a second plurality of setting items corresponding to the second backup data obtained from the second backup source apparatus, wherein the communication apparatus obtains and sets up the third setting value of the third setting item that is the same as the first setting value of the first setting item from the first backup data obtained from the first backup source apparatus in response to a selection of the first setting item from among the first plurality of setting items corresponding to the first backup data obtained from the first backup source apparatus displayed on the first screen, and wherein the communication apparatus obtains and sets up the fourth setting value of the fourth setting item that is the same as the second setting value of the second setting item that is different from the first setting item from the second backup data obtained from the second backup source apparatus in response to a selection of the second setting item from among the second plurality of setting items corresponding to the second backup data obtained from the second backup source apparatus displayed on the second screen.

\* \* \* \* \*